F. P. JOHNESS.
APPARATUS FOR METAL FOUNDING
APPLICATION FILED AUG. 18, 1904.

911,244.
Patented Feb. 2, 1909.

Witnesses
Geo. W. Young
N. E. Oliphant

Inventor
Frank P. Johness
By H. G. Underwood
Attorneys

UNITED STATES PATENT OFFICE.

FRANK P. JOHNESS, OF RACINE, WISCONSIN.

APPARATUS FOR METAL-FOUNDING.

No. 911,244. Specification of Letters Patent. Patented Feb. 2, 1909.

Application filed August 18, 1904. Serial No. 221,206.

*To all whom it may concern:*

Be it known that I, FRANK P. JOHNESS, a citizen of the United States, and resident of Racine, in the county of Racine and State of Wisconsin, have invented certain new and useful Improvements in Apparatus for Metal-Founding; and I do hereby declare that the following is a full, clear, and exact description thereof.

My invention has for its object to economize time and material in foundries, and it consists in chaplets for use in connection with detachable stems, as hereinafter more particularly set forth with reference to the accompanying drawings and subsequently claimed.

Figure 1:
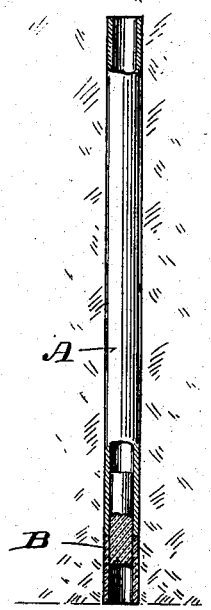
Figure 2:
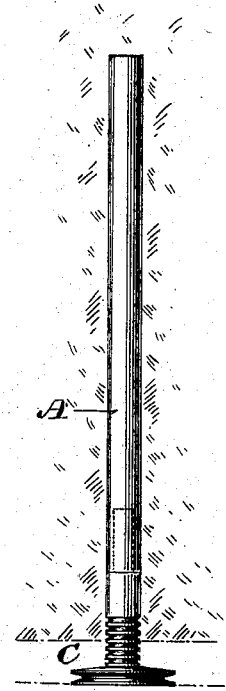
Figure 3:
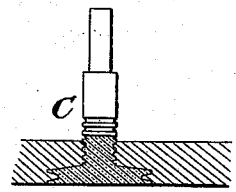
Figure 5:
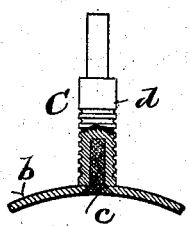
Figure 4:
Figure 6:
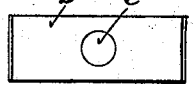

Figure 1 of the drawings represents a partly sectional elevation of a chaplet-stem in detachable connection with a chaplet-print and set therewith in the sand of a section of a mold to impinge against a pattern; Fig. 2 an elevation of a chaplet and its detachable stem, the chaplet being in position to impinge against a core set in the mold; Fig. 3, a partly sectional elevation illustrating the chaplet in a fragment of a casting, the stem being detached; Fig. 4, an end view of the chaplet shown in Figs. 2 and 3; Fig. 5, a partly sectional elevation of another form of chaplet, and Fig. 6, an end view of the latter form of chaplet.

Referring by letter to the drawings, A indicates a preferably tubular stem, B a chaplet-print and C a chaplet, the print and chaplet being interchangeable with the stem. The chaplet-print is preferably a sleeve and a pin rigid one upon the other, the sleeve being partly filled by the pin an exposed portion of which serves as a dowel with which the stem A has detachable connection flush with said sleeve. However the chaplet-print may be a one piece device partly tubular or otherwise at one end and reduced at its other end to provide a dowel on which to fit the stem A, this stem being either tubular throughout or solid, except for a socket at one or both ends thereof in which to fit the dowel-end of a chaplet-print or chaplet. Ordinary commercial iron pipe of suitable bore is economical material from which to make stems similar to the one A herein shown, and chaplet-prints may be utilized to lengthen a stem. A plurality of the preferred form of chaplet-print may be employed in dowel-joint connection to form a stem or as an extension of the same.

The chaplet-head is of variable form, but in any form it has a preferably corrugated shouldered shank the reduced or dowel portion of which fits in the detachable stem that is then flush with the remainder of said shank. The flat round head of one form of chaplet herein shown is provided with a peripheral groove, this groove and the shank-corrugations being provided to insure a good bond of said chaplet in a casting. However the chaplet-head and chaplet-shank may be otherwise irregular in the matter of contour for the purpose aforesaid.

The chaplet best shown in Fig. 5, consists of a segmental preferably sheet-metal head $b$ of any predetermined radius, a headed wrought or cast-metal pin $c$ countersunk in said head, central of the same, and a preferably corrugated shank $d$ cast on the pin.

In foundry practice a stem A and chaplet-print in detachable dowel-joint flush connection are set in the sand of a mold section, said print being in opposition to a pattern. On removal of the pattern, the chaplet-print is withdrawn from the stem and a chaplet substituted in detachable dowel-joint flush connection with said stem, the length of the chaplet being such that its head will impinge a core properly positioned in the mold. The joint of the stem and chaplet is always far enough in the sand to leave a good exposure of the chaplet-shank, and the bond of said chaplet and the casting is such that leakage in said casting is avoided.

The casting being separated from the sand, the detachable stem is removed from the chaplet and saved for future use, the protruding portion of said chaplet being broken or cut away close to said casting. This saving of the stem for use over and over again is an economy in foundry practice, and the cost of my chaplets, designed for detachable stems on hand in a foundry, is less than that of those commonly employed. There is also advantage in the employment of detachable stems that may be utilized with interchangeable chaplet-prints and chaplets of variable length of shank, in accordance with varying thickness of castings, whether each of these stems be a single piece or a plurality of pieces in dowel-joint connection one with another. It has also been determined that there will be a saving of time in molding operations and greater accuracy of chaplet setting when chaplet-prints and chaplets are employed interchangeably with stems such as are herein specified.

Having thus described my invention, what I claim as new, and desire to secure by Letters-Patent, is:—

1. A molder's set of devices comprising a stem, a chaplet-print having an end dowel, and a chaplet having a dowel-end shank, the chaplet being substituted for the chaplet-print in a mold and said stem having flush-joint engagement with the dowel of the interchangeable part in said mold.

2. A chaplet comprising a segmental head, a headed pin countersunk in the head, and a shank cast on the pin, this shank being detachably engageable with a stem.

3. A chaplet comprising a segmental head, a headed pin countersunk in the head, and a shank that is cast on the pin and has a dowel terminal detachably engageable with a stem.

4. A chaplet comprising a segmental head having a pin projecting therefrom rigid therewith, and a shank cast on the pin for detachable engagement with a stem.

In testimony that I claim the foregoing I have hereunto set my hand at Racine in the county of Racine and State of Wisconsin in the presence of two witnesses.

FRANK P. JOHNESS.

Witnesses:
L. V. HINDS,
W. H. CARPENTER.